June 28, 1960  R. E. UHLENHAUT ET AL  2,942,678
WHEEL SUSPENSION SYSTEM WITH SWINGING HALF-AXLES
Filed Nov. 10, 1954  2 Sheets-Sheet 1
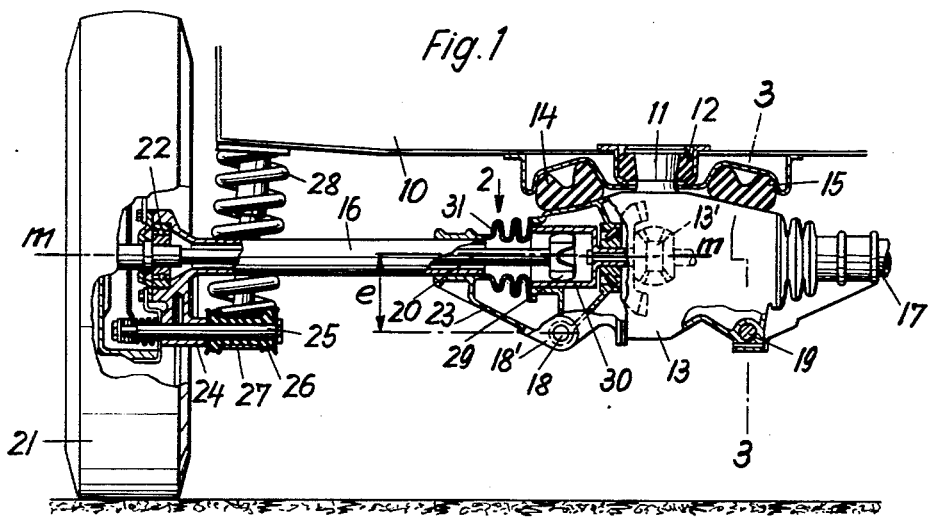
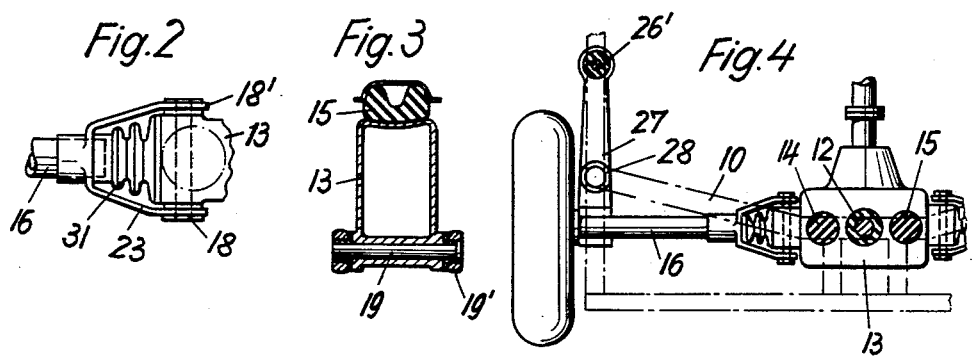
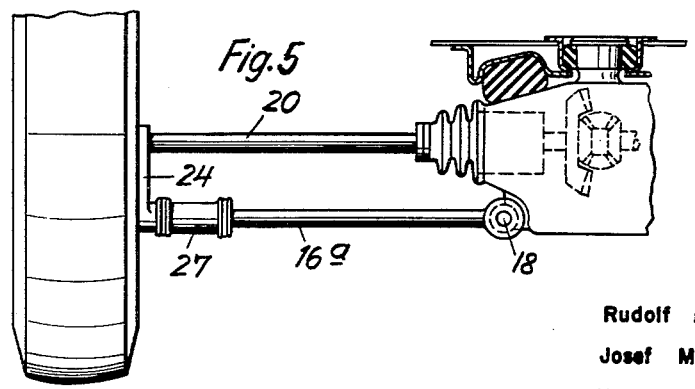
INVENTOR
Rudolf E. Uhlenhaut
Josef Müller
Hans O. Scherenberg
BY Licke & Craig
ATTORNEY June 28, 1960     R. E. UHLENHAUT ET AL     2,942,678
WHEEL SUSPENSION SYSTEM WITH SWINGING HALF-AXLES
Filed Nov. 10, 1954     2 Sheets-Sheet 2
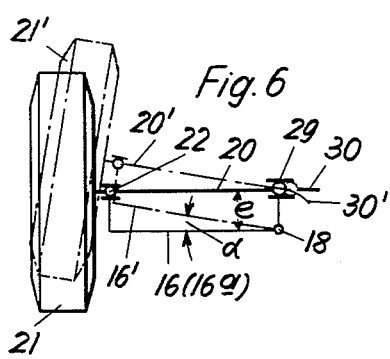
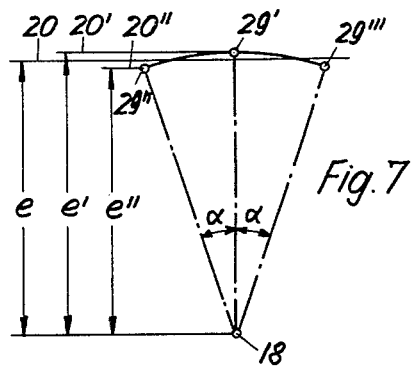
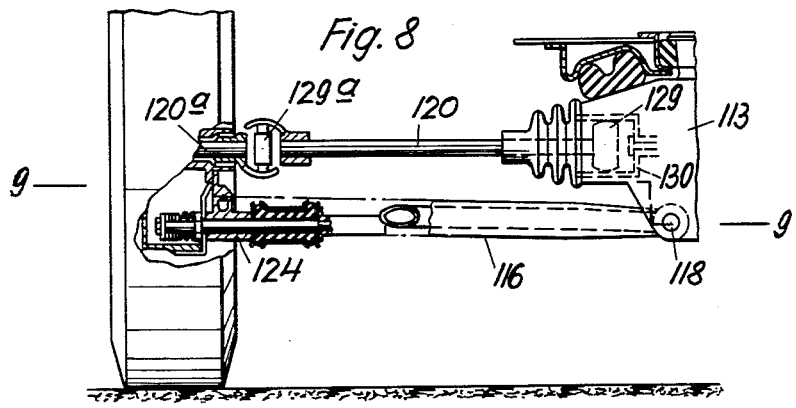
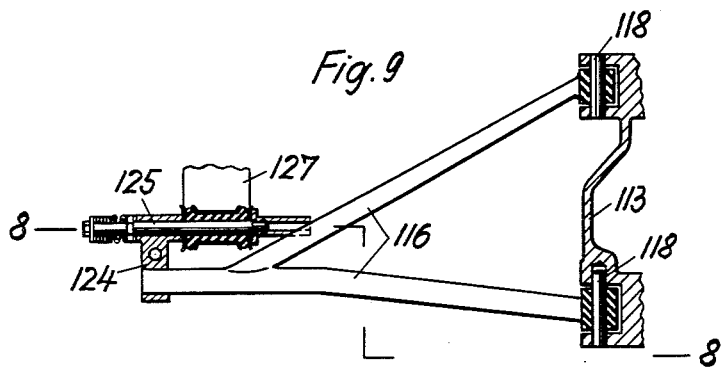
INVENTOR
Rudolf E. Uhlenhaut
Josef Müller
Hans O. Scherenberg
BY
ATTORNEY

United States Patent Office 2,942,678
Patented June 28, 1960

2,942,678

WHEEL SUSPENSION SYSTEM WITH SWINGING HALF-AXLES

Rudolf E. Uhlenhaut and Josef Müller, Stuttgart, and Hans O. Scherenberg, Stuttgart-Heumaden, Germany, assignors to Daimler-Benz Aktiengesellschaft, Stuttgart-Unterturkheim, Germany Filed Nov. 10, 1954, Ser. No. 468,086

Claims priority, application Germany Nov. 14, 1953

7 Claims. (Cl. 180—73)

The present invention relates to improvements in wheel suspensions for motor-driven vehicles of the type as described in the copending application, Serial No. 298,245, now United States Patent 2,806,713, which is assigned to the assignee of the present application, and in which the wheels are mounted on jointed cross-shaft or swinging half-axles which, in turn, are pivotably suspended on the axle mounting, for example, the gear transmission housing which is resiliently mounted on the car body, and are supported by thrust arms.

A wheel suspension of this type has the advantage over other known designs in which the swinging half-axles are supported by thrust arms that, when the wheels swing equally upwardly or downwardly, the position of the half-axles perpendicularly to the driving direction of the vehicle will not change and the wheels will not vary in the least from the driving direction. If only one of the two wheels should swing and then pivot about the forward pivotal point of the thrust arm, the length of the axle corresponding to the entire wheel tread will act as a lever, so that the wheel will steer out or deflect from the true driving direction only very slightly. With the axle mounting being pivoted on the car body above the center of the axle, such deflection may be further reduced by placing the pivotal connections between the thrust arms and the half-axles below the wheel center. An undesired "steering" of the wheels when swinging upwardly or downwardly may thus be almost entirely avoided despite the connection to lateral thrust arms which have the considerable advantage of taking up tangential stresses and brake couples, so that the axle mounting, particularly the gear transmission housing, will be relieved of these forces and the axle mounting as well as the half-axles themselves may be made of smaller dimensions.

It is now the primary object of the present invention to improve a wheel suspension of the type as described so as to obtain a still better roadability of the automobile.

A principal feature of the invention for attaining this object essentially consists in resiliently supporting the axle mounting on the vehicle body by means of a joint located above wheel center, and securing each of the half-axles on the axle mounting by means of joints or pivots located below the wheel center.

Such new constructon of a wheel suspension has the advantage that the variation of the wheel tread caused by the wheels swinging upwardly or downwardly will be reduced and that, when driving through a sharp curve, the relief of pressure of the inner wheel upon the road will be considerably lessened thus avoiding the danger of an additional turning of the inner wheel through lack of friction on the road, the pressure of both wheels will be more uniform and the driving safety of the car be increased. Also, such construction reduces the danger of skidding and turning over on very slippery and icy roads. The resilient suspension of the axle mounting at a point located above the wheel center and, on the other hand, the lowering of the pivotal points of the half-axles also permit the forces and shocks directed transversally to be taken up very softly and smoothly since the transverse forces acting upon the pivots of the half-axles are being met by a large leverage constituted by the vertical distance between the pivot point of the half axles and the points of the axle mounting, permitting the axle mounting with a corresponding leverage to give way about the upper resilient joint. Also, the tendency of the car body to vibrations is thereby considerably reduced and the roadability of the car and its quiet and well-settled position on the road is highly improved.

A preferred feature of the invention further consists in securing the axle mounting at one point with the vehicle body so as to be resilient toward all sides and to be maintained in a central position by such resilient forces. The axle mounting may thus yield resiliently both in a transverse direction so as to be able to take up lateral shocks, as also in a longitudinal direction for compensating the movements of the half-axles caused by the thrust arms or of the axle mounting which is rigidly connected with the half-axles in a horizontal plane.

Furthermore, the use of rubber cushions or bumpers permits the shocks to be taken up more effectively, and, on the other hand, the transmission of noise to the car body to be reduced considerably.

The wheels of the vehicle may be driven by drive shafts which may be placed either within or outside of the swinging half-axles and may consist of either single or double-jointed shafts.

Especially when using single-jointed shafts, the joints or pivots of the half-axles and the joints of the drive shafts are preferably placed vertically above each other so that, when the wheels swing upwardly or downwardly the conditions of movement of the half-axles and the drive shafts will vary with respect to each other as little as possible.

Further objects, features, and advantages of the present invention will appear from the following detailed description and the accompanying drawings of several embodiments of the invention, in which Fig. 1 shows a rear view, partly in section of the new wheel suspension;

Fig. 2 is a top view of the pivotal mounting of the half-axle seen in the direction shown by the arrow 2 in Fig. 1;

Fig. 3 is a cross section taken along line 3—3 in Fig. 1;

Fig. 4 is a diagrammatic plan view of the wheel suspension shown in Fig. 1;

Fig. 5 shows another embodiment of the invention provided with a single-joint drive shaft;

Fig. 6 illustrates diagrammatically the conditions of movement of a swinging half-axle and drive shaft in a swinging wheel;

Fig. 7 is an explanatory diagram pertaining to Fig. 6;

Fig. 8 is a rear view of another embodiment of the invention provided with a double-jointed drive shaft; while Fig. 9 is a top view of the half-axle shown in Fig. 8, partly in a section taken along line 9—9 of Fig. 8.

Referring to Figs. 1 to 4 of the drawings, the frame 10, which may be an integral part of the car body, has a gear transmission housing 13 resiliently suspended thereon by means of a socket containing a rubber cushion 12 surrounding the supporting lug 11. Lateral rubber bumpers 14 and 15 protect the housing 13 from tilting about the central lug 11, as described in the copending application, Serial No. 298,245.

The half-axles 16 and 17 are pivotably mounted on the transmission housing 13 by means of the pivot pins 18 and 19, respectively, which are located at a distance $e$ below the wheel axis $m$—$m$. This pivotal arrangement of each half axle 16 and 17 enables each of the half axles 16 and 17 to swing independently about the respective pivotal pins 18 and 19 in an essentially vertical transverse plane, whereas the half axles 16 and 17, together with the transmission housing 13, form an essentially rigid unit in a horizontal plane due to the fact that both half axles 16 and 17 are essentially non-yielding in the horizontal plane with respect to the transmission housing 13. The half-axles 16 and 17 are of tubular design and enclose the drive shafts 20 of the wheels 21 which, in turn, are rotatably mounted at the ends of the half-axles 16 and 17, respectively, on ball bearings 22. At their inner end, each half-axle 16 and 17 has a downwardly inclined arm 23 carrying a pivot eye 18' and 19', respectively, as shown particularly in Fig. 3. The outer end of each half-axle carries a downwardly extending bracket 24 in which a pivot pin 25 is mounted, one end of which serves as a support for the brake shoes, while the other end, by means of a rubber sleeve 26, serves as a resilient support of a thrust arm 27. The other end of the thrust arm 27, illustrated diagrammatically in Fig. 4 and disclosed in detail in the copending application Serial No. 298,245, above referred to, is preferably likewise mounted on the car body or frame by interposing one or more rubber bumpers or cushions 26'.

A coil spring 28 of suitable strength for resiliently supporting the half-axle 16 or 17, respectively, rests with its lower end on the thrust arm 27 and with its upper end on the frame of car body 19.

The drive shaft 20 is connected by a universal joint 29 permitting an axial movement with respect to the hollow shaft 30 of the universal gear 13' which may be driven in a customary manner by a shaft extending longitudinally of the vehicle. The universal joint 29 is located vertically above the axis of the pivot pin 18 or 19, respectively, which connects the forklike or troughlike arm 23 of the half-axle 16 with a lower lateral eye of the transmission housing 13. A resilient sleeve 31 may be used for sealing the joint 29 relative to the tubular half-axle 16.

In the embodiment of the invention shown in Fig. 5, an axle 16a lying entirely below the drive shaft 20 and connected at a point below the wheel center to the wheel supporting bracket 24 is used in place of the tubular axle 16 surrounding the drive shaft 20, as shown in Figure 1. The operation of this embodiment of the invention is otherwise similar to that shown in Figs. 1 to 3.

Fig. 6 diagrammatically shows the half-axle 16 or 16a and the driving shaft 20, the latter together with the wheel 21 being mounted at 22 on the half-axle 16 and connected with the gear shaft 30 by the universal joint 29 provided vertically above and spaced from the pivot pin 18. If the wheel 21 swings upwardly, for example, about the angle α into the uppermost position 21', axle 16 attains the position 16' and drive shaft 20 the position 20'. In order to substantially constantly maintain the desired distance e even in the new position 16' of the half-axle 16, the joint 29 would have to move about the pivot 18 along the arc 30' with the center thereof coinciding with the axis of the pivot 18 rather than along the straight line 30 as is the case. Since the joint 29 is, however, guided within the shaft 30 for movement in the axial direction of the hollow shaft 30, i.e., since the center of the universal joint 29 may move only in the axial direction of the shaft 30 along a straight line, provision is made, as indicated in Figure 7 for the center 29' of the joint 29 not to be spaced from the joint 18 the exact vertical distance e, but a distance e' different from that of the distance e so that, when the half axle 16 or 16a swings through the angle α into the position 29" or 29"', respectively, the center of joint 29 is spaced from the pivot 18 a vertical distance e" which is shorter than the normal distance e from the pivotal shaft 20. The small tilting of the pivotal shaft 20 to the position 20' or 20", respectively, will be easily taken up by the ball bearings 22.

In the modification of the invention shown in Figs. 8 and 9, a swinging half-axle 116 is provided similarly as in Fig. 5 below the drive shaft 120, and, as shown in Fig. 9, this half-axle 116 is made of bifurcated shape with the two ends of the fork being connected to the lower end of the transmission housing 113 and laterally thereof by pivot pins 118.

The outer end of the half-axle 116 is rigidly connected to the wheel supporting bracket 124 outside of and spaced from the thrust arm 127 and the pivot pin 125. The drive shaft 120 is designed as a double-jointed shaft having joints 129 and 129a, the joint 129 connecting the shaft 120 with the hollow shaft 130 of the universal gear, and joint 129a connecting the shaft 120 with the shaft 120a used for mounting the wheel on the wheel supporting bracket 124.

The operation of the wheel suspension shown in Figs. 8 and 9 is otherwise similar to that described in the copending application Serial No. 298,245, above referred to.

While the foregoing description sets forth in detail what we regard as the preferred embodiments of our invention, it is to be understood that numerous changes may be made therein without departing from the spirit and scope of the invention as defined in the appended claims.

Having thus described our invention what we claim as new is:

1. A wheel suspension system for vehicles, comprising a vehicle body, a pair of wheels on opposite sides of the vehicle, supporting means provided intermediate said wheels, means for effectively securing said supporting means at said vehicle body a substantial distance above the rotary axis of each of said wheels to provide flexibility toward all sides, a pair of swingable half-axles, each of said half axles carrying one of said wheels, means for pivotally mounting each of said half axles on said supporting means to enable each half axle to swing relative to said supporting means about the pivot axis extending substantially in the longitudinal direction of said vehicle and located below said wheel axis, while constituting said half axles together with said supporting means a rigid unit in a horizontal plane, a pair of thrust arms, means at one end of each of said thrust arms for pivotally connecting the same to a respective one of said half-axles, and means for pivotally connecting the other end of said thrust arms to said vehicle body.

2. A wheel suspension system for vehicles according to claim 1, wherein the means at one end of each of said thrust arms for pivotally connecting the same to a respective one of said half axles is located below the respective wheel axis.

3. A wheel suspension system for vehicles according to claim 1, further comprising transmission means, a pair of drive shafts connecting said transmission means with each of said wheels, each of said half axles being tubular and enclosing one of said drive shafts, and each of said half axles being provided with a downwardly extending arm at the inner end thereof for the pivotal connection thereof at said supporting means.

4. A wheel suspension system for vehicles according to claim 1, further comprising transmission means, a pair of drive shafts each connecting said transmission means with one of said wheels, each of said half axles extending from said supporting means to a respective one of said wheels substantially below the respective wheel axis and being provided at the outer end thereof with an upwardly directed arm carrying a respective one of said wheels.

5. A wheel suspension system for vehicles according to claim 1, further comprising transmission means, a pair of drive shafts, a universal joint connecting the inner end of each of said drive shafts with said transmission means and another universal joint connecting the outer end of each of said shafts with a respective one of said wheels.

6. A wheel suspension system for vehicles according to claim 5, wherein each of said swingable half axles is substantially V-shaped with the two arm portions of said V at their common point of juncture carrying a respective one of said wheels.

7. A wheel suspension system for vehicles according to claim 1, wherein said pivotal mounting means for said half-axles and said pivotal connecting means for said thrust arms each include resilient, rubber-like cushions.

References Cited in the file of this patent

UNITED STATES PATENTS

| | | |
|---|---|---|
| 1,937,653 | Haltenberger | Dec. 5, 1933 |
| 2,018,653 | Best | Oct. 29, 1935 |
| 2,417,214 | Roos | Mar. 11, 1947 |
| 2,689,015 | Nallinger | Sept. 14, 1954 |
| 2,806,713 | Muller | Sept. 17, 1957 |

FOREIGN PATENTS

| | | |
|---|---|---|
| 1,063,269 | France | Dec. 16, 1953 |
| 562,775 | Germany | Oct. 28, 1932 |
| 365,491 | Great Britain | Jan. 21, 1932 |